United States Patent [19]
Laux

[11] Patent Number: 5,263,681
[45] Date of Patent: Nov. 23, 1993

[54] MOTOR-TO-SPOOL COUPLING FOR ROTARY-TO-LINEAR DIRECT DRIVE VALVE

[75] Inventor: Kenneth Laux, Newhall, Calif.

[73] Assignee: HR Textron, Inc., Valencia, Calif.

[21] Appl. No.: 979,944

[22] Filed: Nov. 23, 1992

[51] Int. Cl.⁵ ................... F15B 13/044; F16K 31/04
[52] U.S. Cl. .......... 251/129.11; 137/625.65; 384/220
[58] Field of Search ............ 137/625.65; 251/129.11; 384/215, 220

[56] References Cited
U.S. PATENT DOCUMENTS 3,550,631 12/1970 Vanderlaan et al. .......... 137/625.65
4,546,338 10/1985 Idogaki et al. .
4,641,812 2/1987 Vanderlaan et al. .
4,645,178 2/1987 Martin et al. .............. 251/129.11 X
4,742,322 5/1988 Johnson et al. .
4,789,132 12/1988 Fujita et al. .

Primary Examiner—Gerald A. Michalsky
Attorney, Agent, or Firm—Robbins, Berliner & Carson

[57] ABSTRACT

A coupling between the motor of a direct drive valve and a spool for converting rotary-to-linear motion. The coupling includes a split bushing with spring means encircling the same and urging it together. The end of a shaft carried by the rotor of the motor is inserted into an opening in the split bushing to urge it outwardly against the spring.

8 Claims, 2 Drawing Sheets

MOTOR-TO-SPOOL COUPLING FOR ROTARY-TO-LINEAR DIRECT DRIVE VALVE

FIELD OF THE INVENTION

This invention relates to direct drive valves and more particularly to a direct drive valve in which rotational motion of a motor rotor is converted into linear motion of a spool valve and more specifically to the coupling between the rotor and the spool valve.

BACKGROUND OF THE INVENTION

Torque motor driven spool valves are well known in the art including such valves which operate through the utilization of a rotary torque motor having a drive member extending from the rotor thereof into contact with the spool valve to directly reciprocate the spool valve within a bore provided in the valve housing. When the spool valve reciprocates it controls the flow of fluid from a source thereof to a load in response to the electrical signals applied to the drive motor.

Direct drive servovalves of the type above mentioned are illustrated in the following U.S. Pat. Nos. 2,697,016, 2,769,943, 4,339,737, 4,197,474, 4,452,423, 4,793,337, 5,052,441 and 5,040,568.

In all such direct drive servovalves known to Applicant, the spool valve is reciprocated by the free end of the motor shaft contacting the spool through an eccentrically mounted pin having a substantially spherical drive tip. The drive tip is inserted into a well or annular groove formed in the spool. The dimensional relationship between the spherical drive tip and the spool is such as to provide minimal frictional forces and near zero backlash. Utilizing such dimensions necessitates lapping and fitting operations which add greatly to the expense of such devices.

SUMMARY OF THE INVENTION

In accordance with the present invention there is provided a direct drive valve which includes a valve driven by a motor having a stator and rotor. A shaft is carried by the rotor and has a distal end which is received within an opening provided in a split bushing means. Spring means encircles the bushing means. Means for coupling the bushing means to the valve is provided. The bushing means is outwardly expandable upon the distal end of the shaft being inserted into the opening.

DETAILED DESCRIPTION

Figure 1:
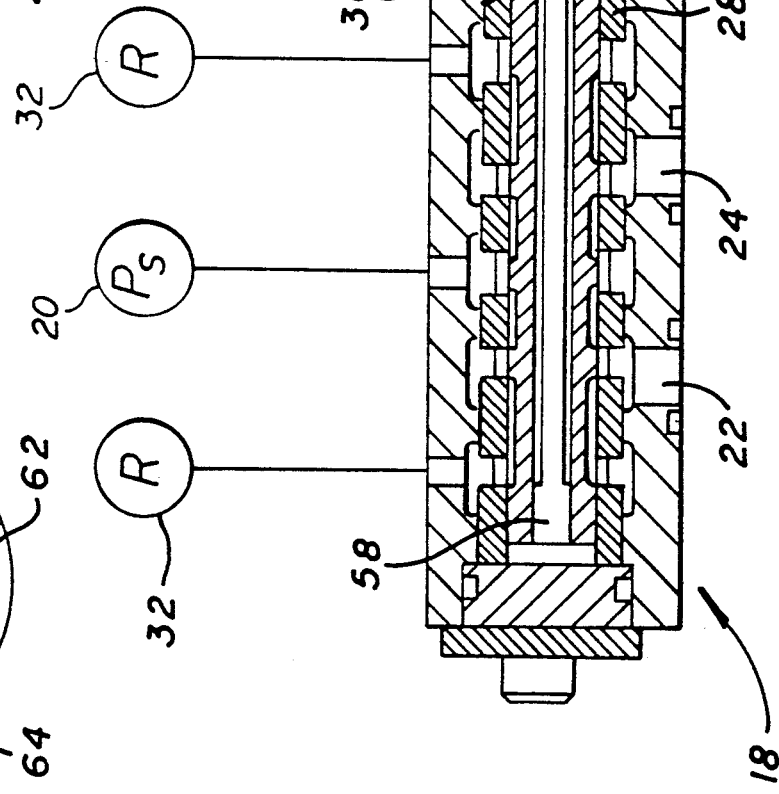
FIG. 1 is a cross-sectional view of a direct drive valve constructed in accordance with the principles of the present invention.

Referring now more specifically to FIG. 1, there is shown a direct drive valve 10 constructed in accordance with the principles of the present invention. As is therein shown, the valve 10 includes a motor 12 which is attached to a housing 14 by fasteners such as bolts 16 as is well known to those skilled in the art. Within the housing 14 there is disposed a reciprocal valve means shown generally at 18 which controls the flow of fluid under pressure from a source 20 thereof to ports 22 and 24 for the control of a load apparatus (not shown). The valve 18 includes a spool 26 which is reciprocally mounted within a sleeve 28 which in turn is mounted within a bore 30 provided within the housing 14. Appropriate ports are provided in the sleeve for communication with the control ports 22 and 24 as well as the source of fluid 20 and the return 32.

The spool 26 is reciprocated within the sleeve 28 to meter the flow of fluid as is well known to those skilled in the art. The reciprocation of the spool 26 is accomplished through appropriate coupling to the motor 12. The motor 12 includes a stator 34 and a rotor 36. The stator 34 includes magnetic pole pieces 38 and 40 and drive windings 42 and 44. These drive windings are connected to receive an electrical drive signal from an external source (not shown). This electrical drive signal controls the positioning of the spool 26 in a manner to be described below.

The drive motor 12 rotor includes permanent magnets 46 carried on a shaft 48 which is supported by appropriate bearings as is well known to those skilled in the art. The shaft 48 includes a distal end in the form of a pin 50, preferably constructed from steel, extending therefrom. The pin 50 is eccentrically disposed with respect to the center line 52 of the shaft 48. The pin 50 is coupled to a fitting 54 which is secured to a rod 56 which in turn is rigidly attached at its opposite end 58 to the spool valve 26.

The fitting 54 carries a split bushing 60 having a plurality of segments which in assembled form in the absence of the pin 50 define an opening of a minimum dimension which receives the pin 50. The pin 50 makes contact with the bushing 60 at pre-selected positions. The pin 50 is dimensioned with respect to the opening in the bushing 60 in such a way that the bushing 60 is caused to outwardly expand upon insertion of the pin 50 into the bushing opening in such a way that it contacts the fitting 54 to form an intimate engagement therewith. The bushing 60 may take a variety of shapes generally in the cross-sectional form of a washer-type configuration so as to provide low friction contact between the pin 50 and the bushing 60. As a result of the dimensional relationship between the bushing and the pin 50, there is substantially zero backlash because there is a press fit between the two. Also because of the press fit and the fact that the bushing 60 expands outwardly when the pin 50 is received therein, there is an automatic self adjustment as the motor 12 cycles during use. It is evident that the structure as shown in FIG. 1 as above described is relatively inexpensive to manufacture and assemble and the parts therein are interchangeable with other similar type direct drive valves, that is, since there is no lap fitting, specific parts do not need to be retained together throughout their lifetimes.

Figure 2:
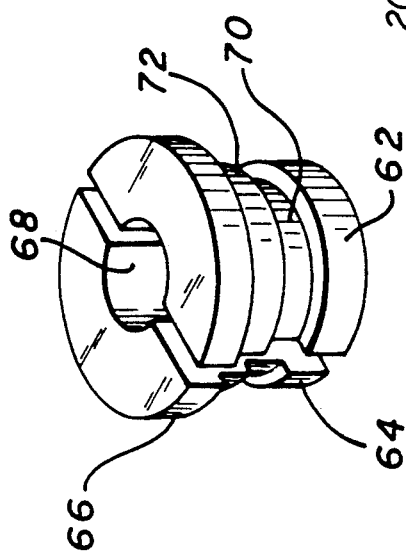
FIG. 2 is a perspective view illustrating one form which a bushing may take.
Figure 3:
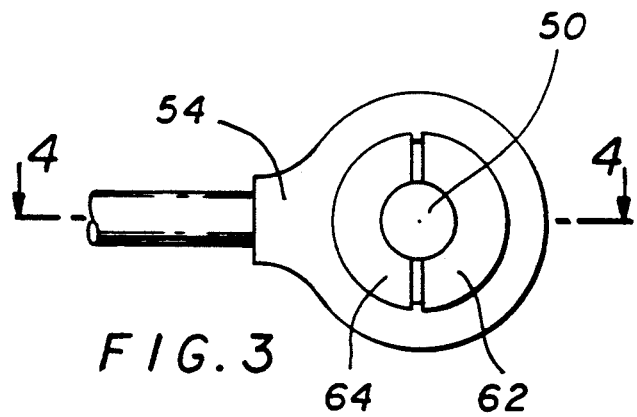
FIG. 3 is a bottom plan view illustrating the coupling between the rotor shaft and valve of FIG. 1.
Figure 4:
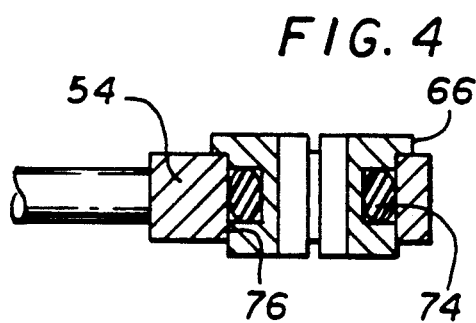
FIG. 4 is a cross-sectional view taken about the lines 4—4 of FIG. 3.

Referring now more particularly to FIG. 2, one form which the bushing 60 may take is illustrated. As is therein shown, the bushing 60 segments include a first bushing half 62 and a second bushing half 64. A flange 66 which protrudes outwardly from the upper portion of each of the bushing halves 62 and 64 is provided to retain the bushing in position on the fitting 54. An opening 68 is defined centrally through the bushing 60. A groove 70 encircles the body 72 of the bushing 60. A spring means such as an O-ring is seated within the groove 70 to urge the bushing halves 62 and 64 toward each other. The bushing 60 may be fabricated from any material desired but in accordance with the preferred embodiment of the present invention, the bushing 60 is machined from brass into the desired shape as illustrated in FIG. 2 and is then split in half. The busing and pin being constructed of dissimilar similar materials eliminate galling. The O-ring as shown at 74 in FIG. 4 is then placed in position in the groove 70 and the bushing 60 is pressed into place within the opening 76 provided in the fitting 54. The O-ring 74 has an outer diameter which slightly exceeds the diameter of the opening 76 and the fitting 54. Thus when the bushing 60 in its assembled form is pressed into the opening 76 of the fitting 54, it is retained in place.

As the pin 50 is inserted into the opening 68 provided by the bushing 60, it urges the bushing halves 62 and 64 apart and into engagement with the surfaces of the opening 76 in the fitting 54. The resiliency of the O-ring 74 permits such movement of the bushing halves 62 and 64. Through this movement of the bushing halves and through the dimensioning of the pin 50 with respect to the opening 68, a light load is maintained on the pin 50 during operation. As a result, the fit between the bushing 60 and pin 50 is automatically self-adjusting as the motor is cycled.

Figure 5:
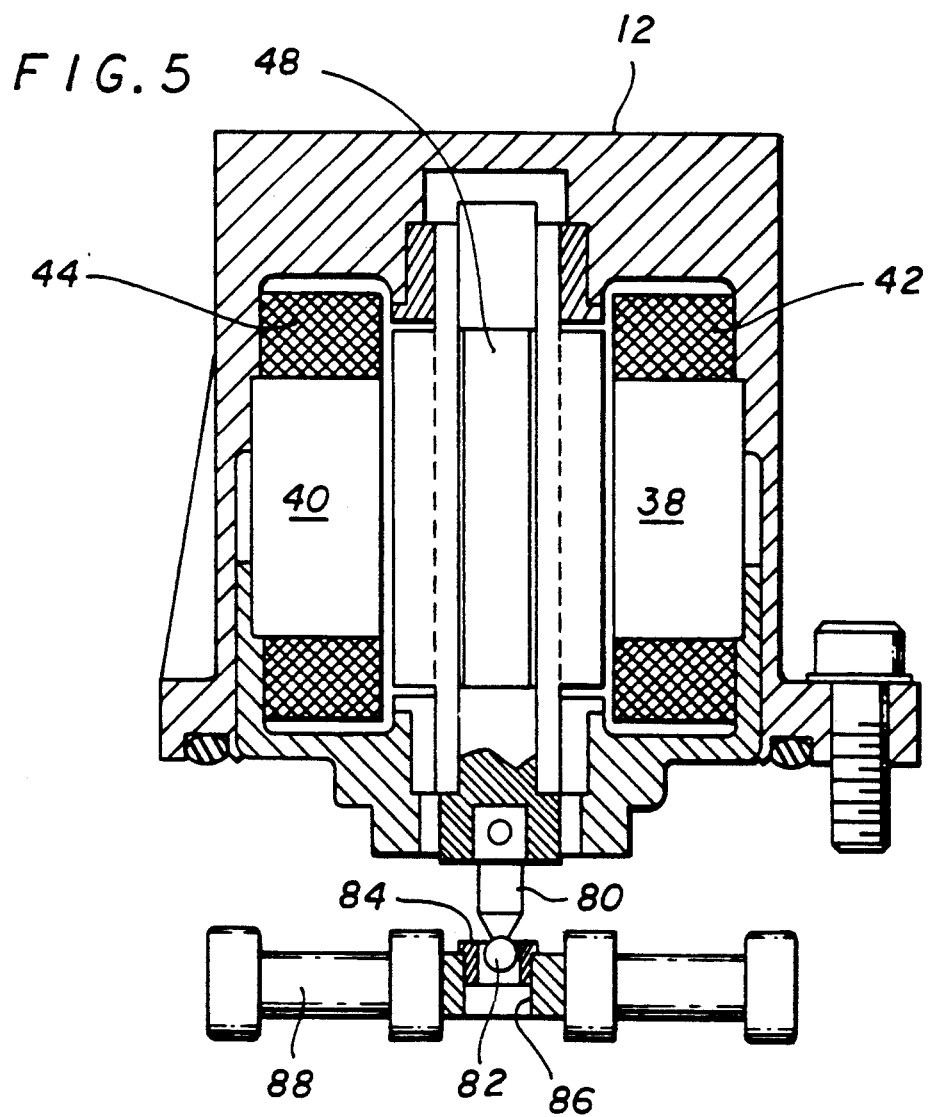
FIG. 5 is a schematic diagram in partial cross-section illustrating an alternative coupling between the rotor shaft and valve.

Reference is now made to FIG. 5 wherein there is illustrated an alternative coupling between the motor and the valve. As is shown in FIG. 5, the more traditional coupling is shown wherein the eccentric pin extending from the shaft of the motor directly engages the spool valve. In this configuration the free end 80 of the shaft 48 of the motor 12 is machined to provide a sphere 82 which functions as the drive tip. The sphere 82 is seated within the split bushing 84 which is positioned within an opening 86 provided in the body of the spool 88. The spool 88 as is well known to those skilled in the art, reciprocates in response to rotation of the shaft 48 to control the flow of fluid from source to load as above described. The bushing 84 is constructed as above described with regard to the bushing 60 of FIG. 2 and functions precisely the same. As a result, a coupling which functions precisely as the prior art couplings utilizing the lap fit ball and well or slot is provided but at a small fraction of the cost.

What is claimed is:

1. A coupling for a rotary-to-linear direct drive valve having a motor including a stator and a rotor and a valve driven by said motor comprising:
   (A) a shaft carried by said rotor and having a distal end;
   (B) a split bushing means having a plurality of segments defining an opening having a minimum dimension therein;
   (C) springs means encircling said bushing and urging said segments together;
   (D) means coupling said bushing to said valve;
   (E) said distal end of said shaft being received in said opening; and
   (F) said bushing means being outwardly expandable against said spring means upon said distal end of said shaft being inserted into said opening.

2. A coupling for a rotary-to-linear direct drive valve as defined in claim 1 wherein said bushing means includes a body portion defining a groove about the periphery thereof, said spring means being seated within said groove.

3. A coupling for a rotary-to-linear direct drive valve as defined in claim 2 wherein said spring means is an O-ring.

4. A coupling for a rotary-to-linear direct drive valve as defined in claim 3 wherein said bushing includes two segments and further defines an outwardly extending flange at an end thereof.

5. A coupling for a rotary-to-linear direct drive valve as defined in claim 4 wherein said distal end includes a pin having a first diameter, said first diameter being greater than the minimum dimension of said opening in said bushing when said segments are urged together in the absence of said pin.

6. A coupling for a rotary-to-linear direct drive valve as defined in claim 5 wherein said coupling means includes a rod having one end connected to said valve and a fitting connected to an opposite end of said rod, said bushing means being received by said fitting.

7. A coupling for a rotary-to-linear direct drive valve as defined in claim 5 wherein said valve is a spool valve defining an opening therein and said bushing means is received within said spool valve opening.

8. A coupling for a rotary-to-linear direct drive valve as defined in claim 5 wherein said distal end is a pin having a spherical ball at its end, said ball being received within said opening in said bushing means.

* * * * *